(12) United States Patent
Gretz (10) Patent No.: US 10,205,310 B1
(45) Date of Patent: Feb. 12, 2019

(54) FLANGED VAPOR BOX (71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 0 days.

(21) Appl. No.: 16/007,690

(22) Filed: Jun. 13, 2018

Related U.S. Application Data (60) Provisional application No. 62/519,367, filed on Jun. 14, 2017.

(51) Int. Cl.
*H02G 3/08* (2006.01)

(52) U.S. Cl.
CPC ............ *H02G 3/088* (2013.01); *H02G 3/085* (2013.01)

(58) Field of Classification Search
CPC ............................... H02G 3/088; H02G 3/085
USPC ........................................................ 174/250
See application file for complete search history.

(56) References Cited

U.S. PATENT DOCUMENTS

| 4,265,365 | A | * | 5/1981 | Boteler | ................... | H02G 3/088 |
| | | | | | | 174/53 |
| 4,408,695 | A | | 10/1983 | Balkwill | | |
| 4,484,021 | A | | 11/1984 | Schaefer et al. | | |
| 4,794,207 | A | | 12/1988 | Norberg et al. | | |
| 4,952,754 | A | | 8/1990 | Rye | | |
| 7,518,061 | B1 | * | 4/2009 | Gretz | ................... | H01R 25/006 |
| | | | | | | 174/50 |
| 7,582,827 | B1 | * | 9/2009 | Gretz | ................... | H02G 3/121 |
| | | | | | | 174/481 |
| 7,674,974 | B1 | | 3/2010 | Shotey et al. | | |
| 8,212,144 | B1 | * | 7/2012 | Gretz | ................... | H02G 3/086 |
| | | | | | | 174/480 |
| 8,975,518 | B1 | * | 3/2015 | Gretz | ................... | H02G 3/086 |
| | | | | | | 174/50 |
| 9,780,546 | B2 | | 10/2017 | Carbone et al. | | |
| 2013/0264088 | A1 | * | 10/2013 | Dinh | ................... | H05K 5/06 |
| | | | | | | 174/50.54 |
| 2017/0294768 | A1 | * | 10/2017 | Thomas | ................ | H02G 3/121 |

\* cited by examiner

*Primary Examiner* — Timothy J Thompson
*Assistant Examiner* — Charles Pizzuto (57) ABSTRACT

A flanged vapor box for mounting an electrical component in a wall or similar structure while preventing air infiltration around or through the box. The vapor box includes a flange with an integral face gasket and one or more cable gaskets at cable entry points into the box. The face gasket prevents seepage of air between the drywall and the box. The cable gaskets seal around any inserted electrical cables to prevent infiltration into the inside environment. Captive fasteners include end portions integral with the box and can be rapidly tightened to secure the box to a stud or similar support. Thin tabs on the flanged vapor box provide a means for rapidly and accurately positioning and aligning the box against a stud or similar support. The alignment tabs are substantially thin to avoid creating a bulge in the drywall surrounding the box.

3 Claims, 7 Drawing Sheets

FLANGED VAPOR BOX

CROSS-REFERENCE TO RELATED APPLICATIONS

This application claims the benefit of provisional U.S. Application No. 62/519,367, filed Jun. 14, 2017, the contents of which are incorporated herein in their entirety.

FIELD OF THE INVENTION

This invention relates to electrical boxes and specifically to a flanged vapor box that includes integrally attached gaskets for forming a protective barrier to prevent air infiltration to the inside in order to meet International Energy Conservation Codes (IECC) and other codes.

BACKGROUND OF THE INVENTION

Electrical boxes are commonly used for mounting electrical components such as outlets and switches in homes and commercial buildings. Unfortunately, conventional electrical boxes typically allow air seepage into the living space from within the walls or from the exterior of the building, thereby wasting energy and driving up heating or cooling costs. Several organizations, such as the International Energy Conservation Codes (IECC), now publish guidelines that impose stricter limits on the amount of air infiltration that is acceptable at each newly installed electrical box.

Accordingly, what is needed is an electrical box that prevents air infiltration to the interior of the building in order to meet International Energy Conservation Codes (IECC) and other codes where required.

BRIEF SUMMARY OF THE INVENTION

The invention is a flanged vapor box for mounting an electrical component in a wall or similar structure while preventing air infiltration around or through the box. The flanged vapor box includes a flange with an integral face gasket and one or more cable gaskets at cable entry points into the box. The face gasket is integral with the front surface of the flange to prevent seepage of air between the drywall that is later installed around the box. The cable gaskets seal around any electrical cables at the entry of the electrical fitting and prevent air infiltration into the inside environment. The end portions of captive fasteners extend from the box and can be rapidly tightened to secure the flanged vapor box to a stud or similar support. Flange extensions extend from the end walls and captive fasteners captive are held within flange extensions. Thin alignment tabs on the flanged vapor box provide a means for rapidly and accurately positioning and aligning the box against a stud or similar support. The alignment tabs are substantially thin to avoid creating a bulge in the drywall surrounding the box.

OBJECTS AND ADVANTAGES

It is accordingly an object of the invention to provide a flanged vapor box for mounting electrical components to a stud in new construction.

It is a further object of the invention to provide a flanged vapor box that includes integrally attached gaskets for forming a protective barrier to strictly limit air infiltration inside to meet International Energy Conservation Codes (IECC) and other codes where required.

It is a further object of the invention to provide a flanged vapor box with captive fasteners for rapidly securing an electrical box to a stud.

It is a further object of the invention to provide a flanged vapor box that includes an electrical box formed of non-conductive materials.

It is a further object of the invention to provide a flanged vapor box with thin alignment tabs that properly position the vapor box on a stud and that avoid creating a drywall bulge.

A further object is to provide a non-metallic (NM) cable connector positioned in one or more knockouts the vapor box.

It is another object of the invention to provide a flanged vapor box including integral cable gaskets over the installed NM cable connectors for sealing around any electrical cables that are inserted through the knockouts into the vapor box.

These and other objects of the invention will be obvious in view of the following description and with reference to the accompanying drawings.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

Figure 1:
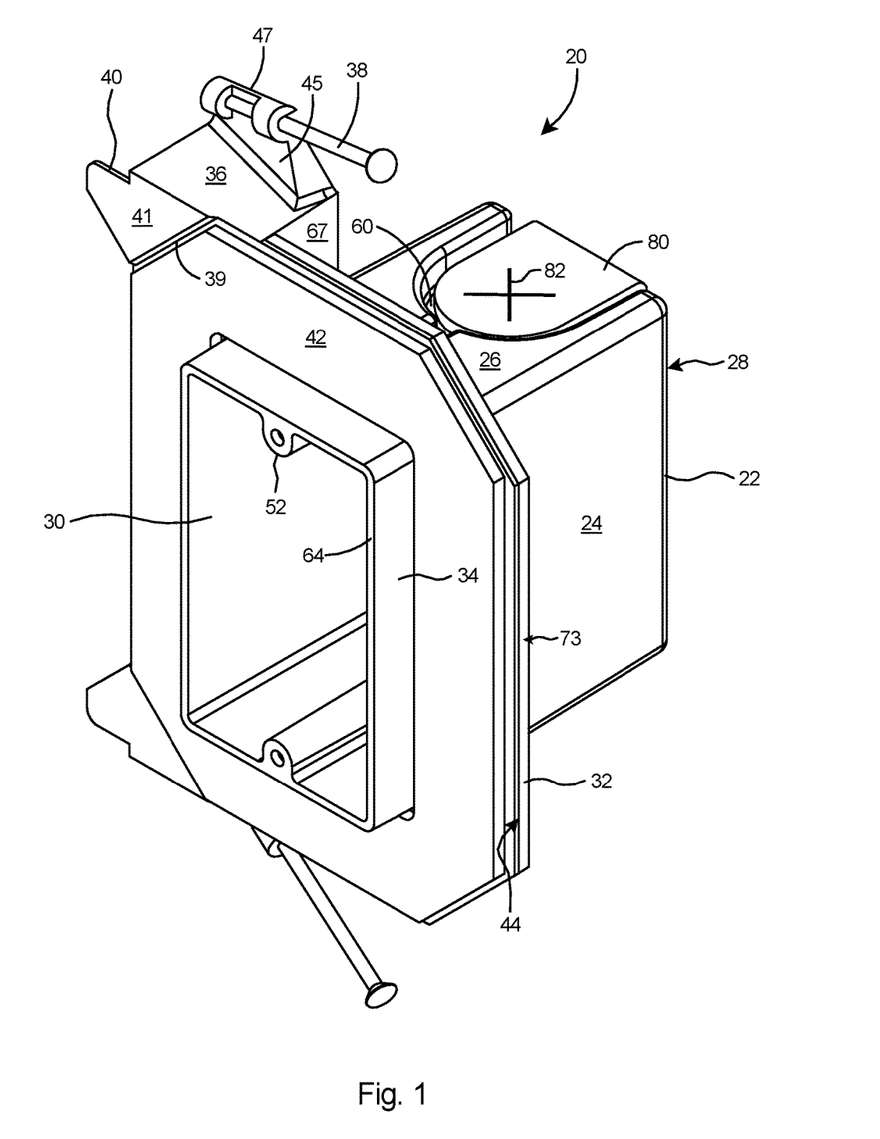
FIG. 1 is a front isometric view of a first and preferred embodiment of a flanged vapor box, in accordance with embodiments of the invention.
Figure 5:
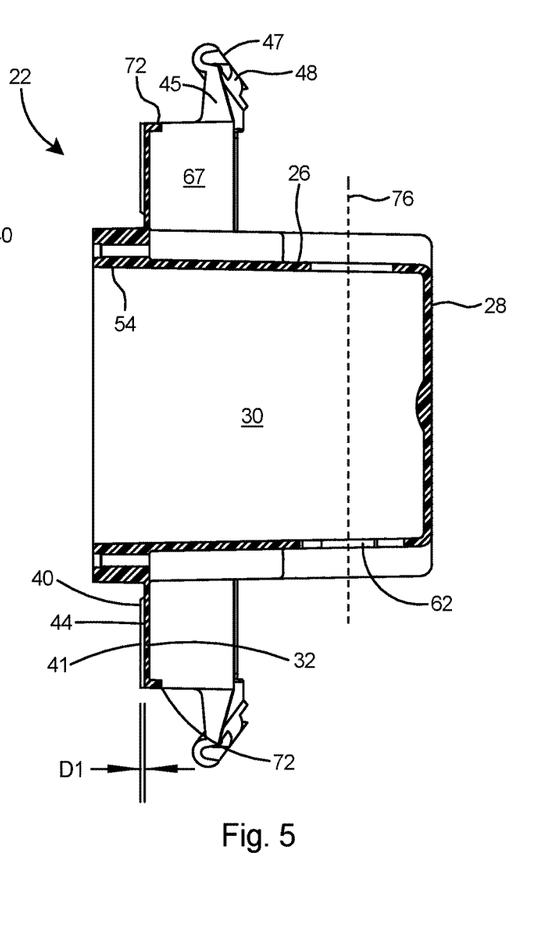
FIG. 5 is a sectional view of the electrical box taken along line 5-5 of FIG. 2.
Figure 6:
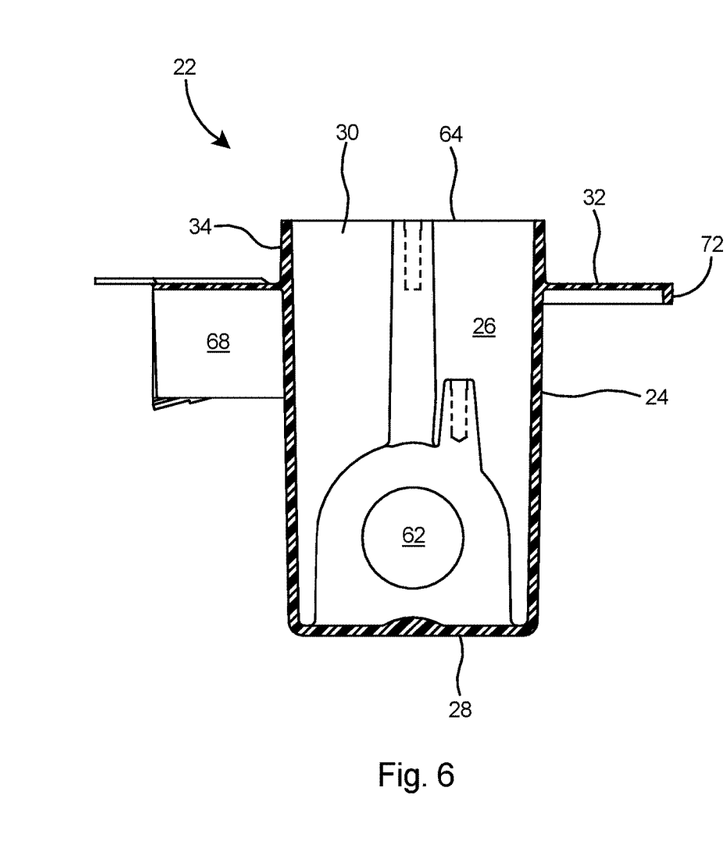
FIG. 6 is a sectional view of the electrical box taken along line 6-6 of FIG. 2.

With reference to FIG. 1, there is shown a preferred embodiment of a flanged vapor box 20 according to the present invention. The flanged vapor box 20 includes an electrical box 22 with side walls 24, end walls 26, and a back wall 28 defining an electrical enclosure 30 therein. A flange 32 extends from the side walls 24 and a peripheral wall 34 extends forward of the flange 32. Flange extensions 36 extend from the end walls 26 and captive fasteners 38 are included on the flange extensions 36. As shown on the left side of FIG. 1, thin alignment tabs 40 extend from one side of the flanged vapor box. The electrical box includes a stepped edge 39 at the juncture of the flange 32 and each of the alignment tabs 40. A face gasket 42 covers the front surface 44 of the flange 32. The stepped edge 39 of each alignment tab 40 is stepped as the front face 41 of the tabs 40 project farther forward than the front surface 44 of the flange 32. As shown in FIG. 5, the front face 41 of each tab 40 projects forward, as shown by distance D1, than the front surface 44 of the flange 32.

Figure 2:
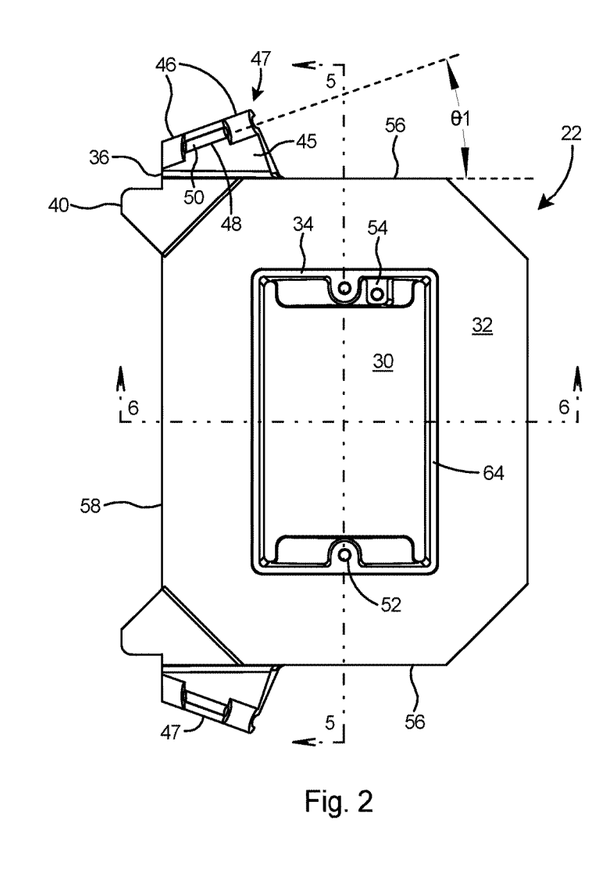
FIG. 2 is a front elevation view of an electrical box that forms a portion of the flanged vapor box of FIG. 1.
Figure 3:
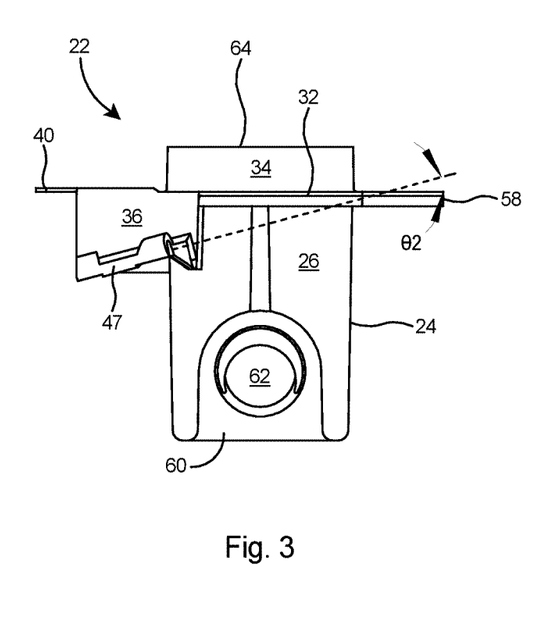
FIG. 3 is an end view of the electrical box.

Referring to FIGS. 2 and 3, an arm 45 extends from each of the flange extensions 36 of the electrical box 22. Each arm 45 includes a boss 47. Each boss 47 includes two end portions 46 and a middle portion 48. Middle portion 48 includes a forward facing groove 50. Component bosses 52 and a ground boss 54 extend from each end wall 26 into the electrical enclosure 30 of the electrical box. The flange 32 includes end edges 56 and side edges 58. As shown in FIG. 2, flange extensions 36 will orient any fastener inserted therein (not shown) at an angle θ1 of between preferably 15 to 25 degrees with respect to the flange end edges 56. Flange extensions 36 will position a fastener (not shown) inserted therein a distance behind the flange 32 and arms 45 will orient a fastener inserted therein at an angle θ2 of between preferably 10 to 20 degrees with respect to the side edges 58. As shown in FIG. 3, the end walls 26 include a recessed wall 60 with a knockout aperture 62 therein. Peripheral wall 34 includes a planar front edge 64.

Figure 4:
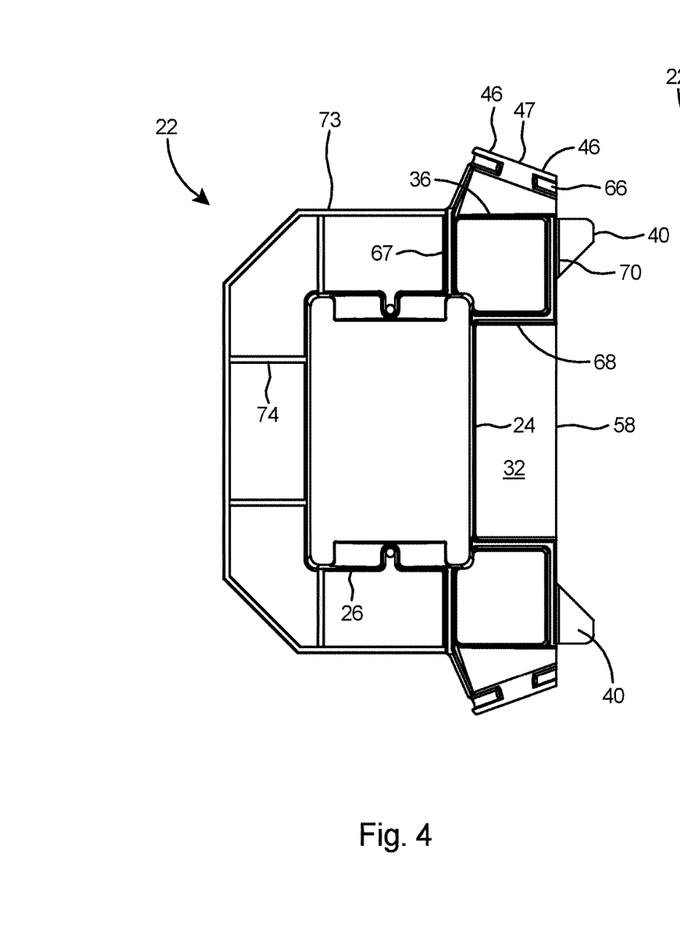
FIG. 4 is a rear elevation view of the electrical box.
Figure 7:
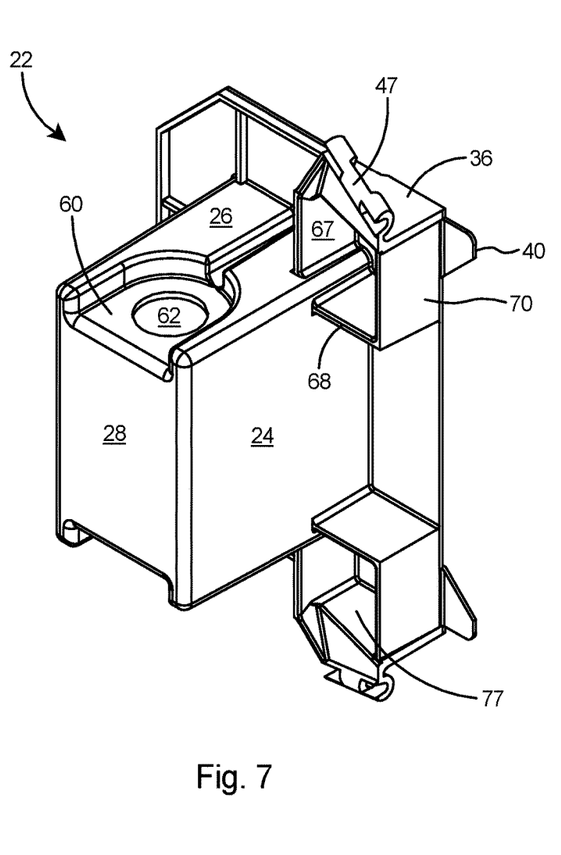
FIG. 7 is a rear isometric view of the electrical box.

With reference to FIGS. 4 and 5, end portions 46 of bosses 47 include a rearward facing groove 66 that is axially aligned with the forward facing groove 50 of the middle portion 48 (see FIG. 2). Braces 67, 68, and 70 extend rearward from the flange 32 and support the flange extension 36. A first brace 67 extends outward from the end walls 26, a second brace 68 extends outward from the side walls 24, and a third brace 70 extends along a first side edge 58 of the flange to support each flange extension 36. A lip 72 extends rearward from the outer edge 73 of the flange 32 and one or more stiffening arms 74 extend between the electrical box side wall 24, the electrical box end walls 26, and the lip 72. Knockout apertures 62 on opposing end walls 26 are substantially axially aligned, such as shown along axis 76 in FIG. 5. As shown in FIG. 7, an open area 77 is formed by the plurality of braces 67, 68, and 70 that extend rearward from the flange 32.

Figure 8:
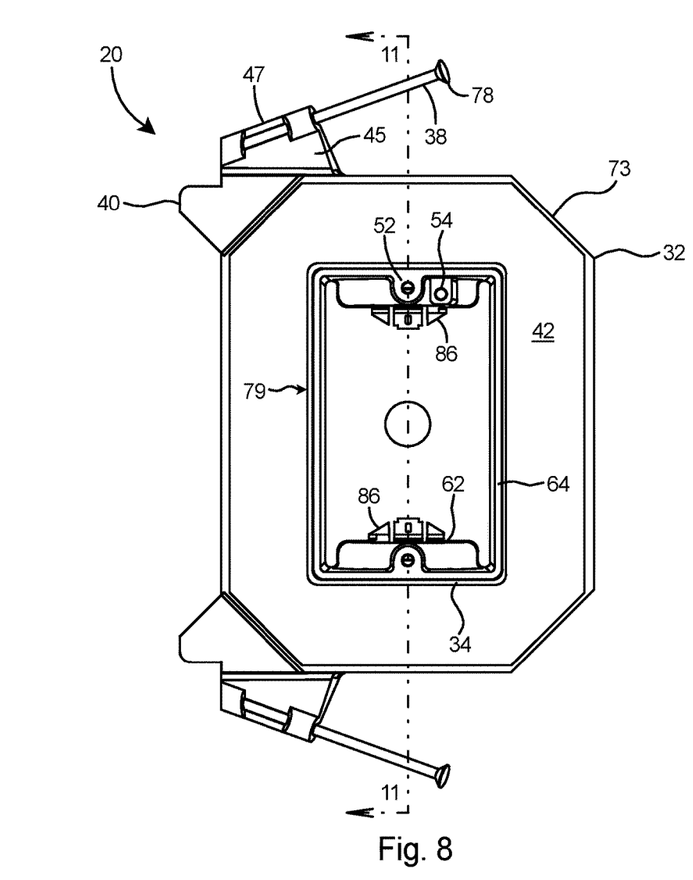
FIG. 8 is a front elevation view of the flanged vapor box.
Figure 9:
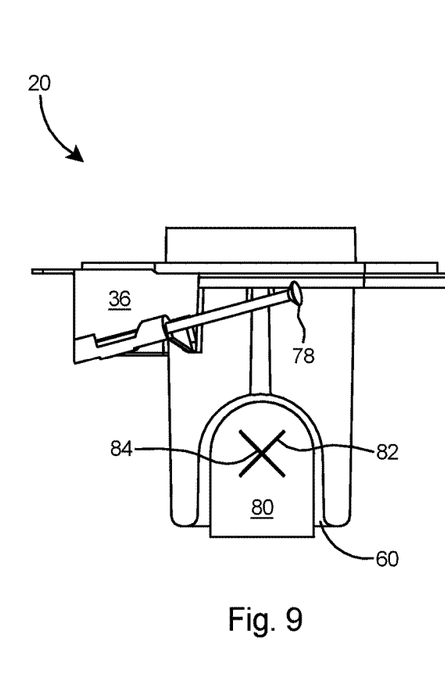
FIG. 9 is an end view of the flanged vapor box.
Figure 10:
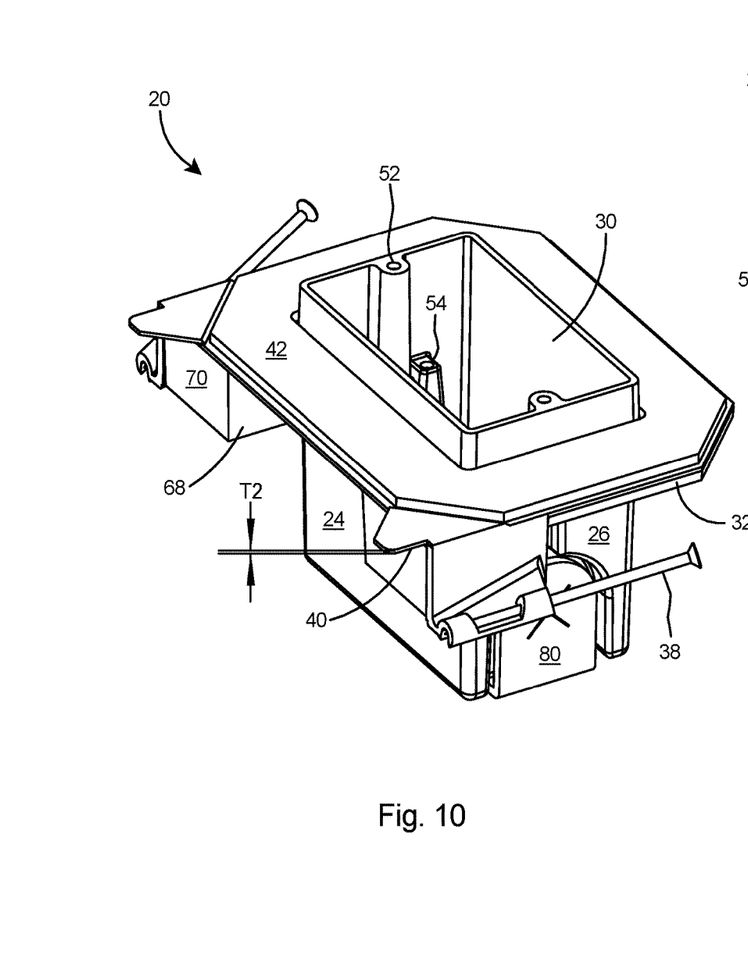
FIG. 10 is an isometric view of the flanged vapor box.

Referring to FIGS. 8 and 9, flanged vapor box 20 includes captive fasteners 38 held captive within the bosses 47. The captive fasteners 38 are oriented with the heads 78 angled toward the front edge 64 of the peripheral wall 34 and are further angled with the heads 78 extending away from the flange extensions 36. This orientation provides an installer with unfettered access to the captive fasteners 38 when installing the flanged vapor box 20 to a stud or similar support. Face gasket 42 is integral with the front surface of the flange 32 to prevent seepage of air between the drywall (not shown) that is later installed around the box. The face gasket 42 extends from the outer periphery 79 of the peripheral wall 34 to the outer edge 73 of the flange 32. A cable gasket 80 is integral with the electrical box surface surrounding the recessed wall 60. Two intersecting slits 82 are provided in the cable gasket 80. The intersection 84 of the slits are axially aligned with the axis 76 (see FIG. 5) through the knockout apertures 62. An electrical fitting 86 is inserted and held captive within one or more of the knockout apertures 62. The captive electrical fitting 86 will capture and provide strain relief to any electrical cable inserted through the fitting.

Figure 11:
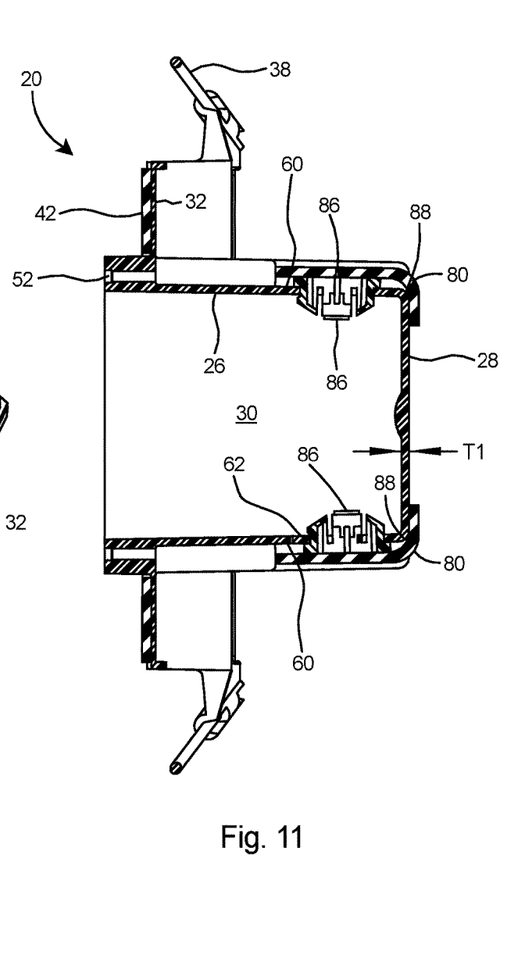
FIG. 11 is a sectional view of the flanged vapor box taken along line 11-11 of FIG. 8.

As shown in FIG. 11, the cable gasket 80 extends around and is integral with the corner 88 at the intersection of the recessed wall 60 and back wall 28. Cable gasket 80 will seal around any electrical cable (not shown) inserted through the electrical fitting 86 and prevents infiltration of air into the electrical enclosure 30. The intersecting slits 82 in the cable gasket are substantially axially aligned with the electrical fitting 86 and the knockout apertures 62. Preferably, as shown in FIG. 11, the side walls 24, the end walls 26, and the back wall 28 include a thickness T1 that is preferably at least 0.085 inch and the thickness of the tabs 40 is at least one half the thickness of the side walls 24, the end walls 26, and the back wall 28. Most preferably the thickness T2 of the tabs 40 is less than 0.050 inches.

Figure 12:
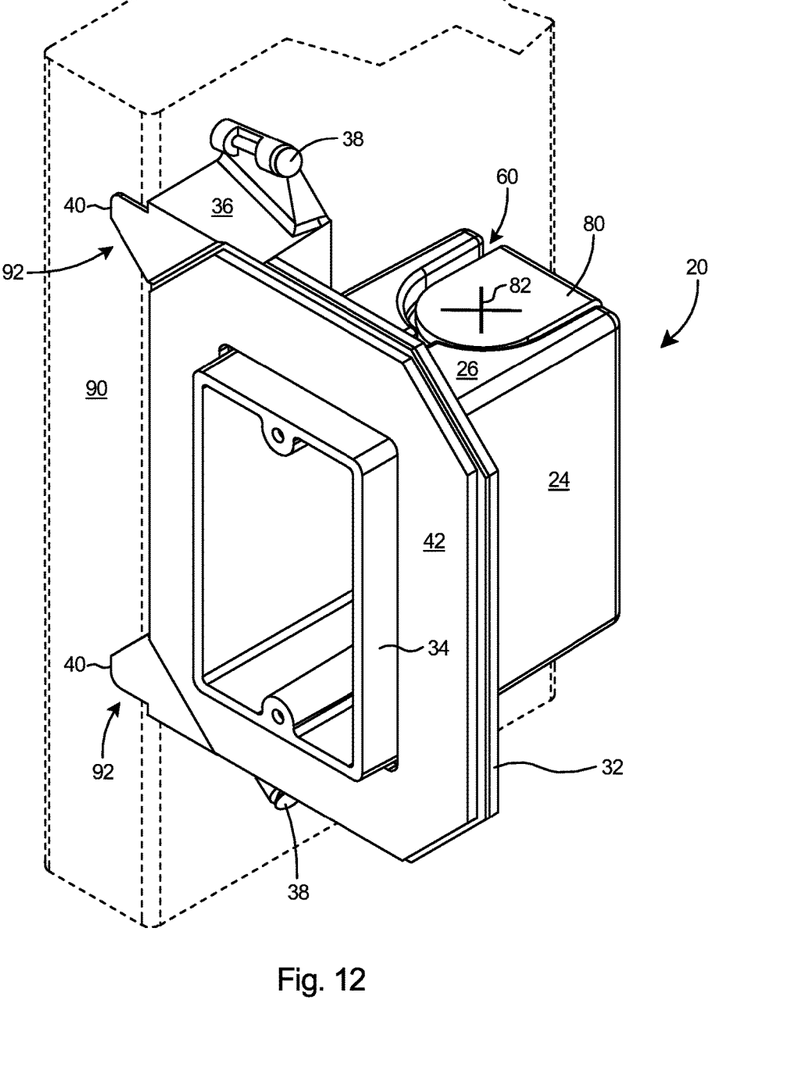
FIG. 12 is a front isometric view of the flanged vapor box secured to a stud.

With reference to FIG. 12, flanged vapor box 20 is shown secured by captive fasteners 38 to a stud 90 in a newly constructed wall. The thin alignment tabs 40 provide an alignment means 92 for rapidly aligning the flanged vapor box 20 with the stud. Peripheral wall 34 extends a preferred distance from the face gasket 42, with the distance preferably equal to the thickness of the drywall (not shown) that will be installed around the box. Integral face gasket 42 will provide a seal between the flange 32 and the drywall. Cable gasket 80 will seal around an electrical cable (not shown) at the entry of the electrical fitting 86 (see FIGS. 8 and 9) and prevent entry of air or vapor into the electrical enclosure 30. For the convenience of installation the fasteners 38 ship captive in the flanged vapor box and the electrical fittings 86 and flange 32 have the gasket material attached, so no assembly is required at the job site.

The electrical box 22 is preferably molded in one piece of plastic and is thus non-conductive. Face gasket 42 and cable gasket 80 are preferably constructed of foam rubber. The electrical fitting 86 may be the BLACK BUTTON® push-in fitting or connector for connecting non-metallic cable to electrical boxes. The BLACK BUTTON® push-in fitting is available from Arlington Industries of Scranton, Pa. Use of the push-in fitting will enable simple push-in connection of a non-metallic cable to the flanged vapor box.

What is claimed is:

1. A flanged vapor box comprising:
an electrical box with side walls, end walls, and a back wall defining an enclosure;
a flange extending from the side walls of said electrical box, said flange including a front surface and an outer edge;
a peripheral wall extending from the front surface of the flange;
a flange extension extending from the end walls;
an arm extending from said flange extension;
a captive fastener in the flange extension;
a tab extending from one of said side walls of said flanged vapor box;
a face gasket on the front surface of the flange;
said tab extending forward of the front surface of the flange thereby forming a stepped edge at a juncture of said flange and said tab; and
said face gasket on said front surface of said flange extending to said stepped edge.

2. A flanged vapor box comprising:
an electrical box with side walls, end walls, and a back wall defining an enclosure;
a flange extending from the side walls of said electrical box, said flange including a front surface and an outer edge;
a peripheral wall extending from the front surface of the flange;
a flange extension extending from the end walls;
an arm extending from said flange extension;
a captive fastener in the flange extension;
a cable gasket extending across an electrical fitting and a knockout aperture; and
intersecting slits in said cable gasket extending across said electrical fitting and said knockout aperture.

3. A flanged vapor box comprising:
an electrical box with side walls, end walls, and a back wall defining an enclosure;

a flange extending from the side walls of said electrical box, said flange including a front surface and an outer edge;
a peripheral wall extending from the front surface of the flange;
a flange extension extending from the end walls;
an arm extending from said flange extension;
a captive fastener in the flange extension;
a face gasket on the front surface of the flange;
a cable gasket extending across an electrical fitting and a knockout aperture; and
intersecting slits in said cable gasket extending across said electrical fitting and said knockout aperture.

* * * * *